United States Patent [19]

Ohsawa

[11] Patent Number: 5,090,027
[45] Date of Patent: Feb. 18, 1992

[54] COHERENT PSK DEMODULATOR WITH ADAPTIVE LINE ENHANCER

[75] Inventor: Tomoki Ohsawa, Tokyo, Japan
[73] Assignee: NEC Corporation, Tokyo, Japan
[21] Appl. No.: 470,215
[22] Filed: Jan. 25, 1990

[30] Foreign Application Priority Data

Jan. 26, 1989 [JP] Japan .................................. 1-19045
Apr. 21, 1989 [JP] Japan .................................. 1-102487

[51] Int. Cl.$^5$ ........................ H03D 3/22; H04L 27/22
[52] U.S. Cl. ........................................ 375/80; 375/86; 329/304
[58] Field of Search ................................ 375/80–82, 375/86, 14; 328/63, 133; 364/724.19, 724.2; 331/1 A, 4; 333/18, 19, 138; 329/346, 307, 313

[56] References Cited

U.S. PATENT DOCUMENTS

| 4,653,071 | 3/1987 | Sgrignol | 375/86 X |
| 4,875,108 | 10/1989 | Minuhin et al. | 331/1 A X |
| 4,975,927 | 12/1990 | Yoshida | 375/80 X |

OTHER PUBLICATIONS

Widrow et al, "Adaptive Noise Cancelling: Principles and Applications", Proceedings of IEEE, vol. 63, No. 12, Dec. 1975, pp. 1692–1717.

*Primary Examiner*—Benedict V. Safourek
*Assistant Examiner*—Tesfaldet Bocure
*Attorney, Agent, or Firm*—Foley & Lardner

[57] ABSTRACT

A coherent PSK demodulator includes a frequency multiplier for multiplying the frequency of an incoming M-ary PSK signal by a factor M to extract a carrier component of the PSK signal. An adaptive line enhancer is connected to the frequency multiplier for emphasizing the line spectrum of the extracted carrier component. A frequency divider is connected to the output of the enhancer to divide its frequency by a factor M and applies its output to a product demodulator as a local carrier for demodulating the incoming M-ary PSK signal. In a preferred embodiment, a synchronizer is connected between the output of the adaptive line enhancer and the frequency divider. Alternatively, a closed-loop phase error canceller is connected to the output of the product demodulator.

4 Claims, 3 Drawing Sheets

COHERENT PSK DEMODULATOR WITH ADAPTIVE LINE ENHANCER

BACKGROUND OF THE INVENTION

The present invention relates generally to phase and frequency synchronization techniques for PSK (phase-shift keying) demodulators, and more specifically to a coherent PSK demodulator suitable for satellite communications systems.

Phase-locked loops have been extensively used for establishing synchronization with the phase and frequency of an incoming PSK modulated signal. The synchronization characteristic of a phase-locked loop at low signal-to-noise ratios is considered as a factor that contradicts the pull-in characteristic of the loop for a wide range of frequencies. Another disadvantage is that the phase-locked loop has a significantly long pull-in time when the signal-to-noise ratio is low. In addition, a large carrier frequency offset, which occurs often in satellite communications systems, results in a narrowing of the capture range of the phase-locked loop, and hence in a further lengthening of the pull-in time.

SUMMARY OF THE INVENTION

It is therefore an object of the present invention to provide a coherent PSK demodulator having a wide capture range and quick pull-in capability at low signal-to-noise ratios.

This object is obtained by the use of an adaptive line enhancer as a means for emphasizing the line spectrum of the carrier component of an incoming PSK signal against the white Gaussian noise it contains.

Specifically, the coherent demodulator of the invention includes a frequency multiplier for multiplying the frequency of an incoming M-ary PSK signal by a factor M to extract a carrier component of the PSK signal. An adaptive line enhancer is connected to the frequency multiplier for emphasizing the line spectrum of the extracted carrier component. A frequency divider is connected to the output of the enhancer to divide its frequency by a factor M and supplies it to a product demodulator as a local carrier to demodulate the M-ary PSK signal. Preferably, the coherent demodulator includes a phase deviation canceller for cancelling a phase deviation which occurs as a result of a carrier frequency offset. This canceller includes a multiplier for multiplying the output of the product demodulator with a feedback signal applied thereto, a phase variation detector connected to the output of the multiplier, and a circuit that converts the detector output to a complex signal which is supplied to the multiplier as the feedback signal.

According to a first preferred embodiment, there is provided a synchronizer which comprises a digital phase detector for detecting a phase difference between the extracted carrier component and a digital sinusoidal wave. A closed-loop frequency estimation circuit is provided including a first register, a first adder and a digital low-pass filter. The first adder provides a sum of a digital phase difference from the digital phase detector with a content of the first register and supplies the sum to the digital low-pass filter which eliminates frequency components higher than Nyquist frequency from the output of the first adder and supplies a low-pass filtered output to the first register as an update value. A closed-loop phase estimation circuit is also provided which includes a second register and a second adder which provides a sum of the digital phase difference with a content of the second register and supplies the sum to the second register as an update value. The digital sinusoidal wave is generated in accordance with the outputs of the frequency and phase estimation circuits.

According to a second preferred embodiment of this invention, a differentiator is provided to differentiate the output of the adaptive transversal filter and a phase variation detector is provided for detecting a phase variation of the output of the differentiator. An integrator is connected to the phase variation detector for generating an integrated value of the phase variation to the frequency divider. The output of the frequency divider is converted to a pair of complex signals which are applied to the product demodulator. To remove the phase error contained in the carrier extracted from the adaptive line enhancer, a multiplier is provided for multiplying the output of the product demodulator with a feedback signal applied thereto. To derive the feedback signal, a phase variation appearing at the output of the multiplier is detected and converted to a pair of complex signals and supplied to the multiplier.

BRIEF DESCRIPTION OF THE DRAWINGS

The present invention will be described in further detail with reference to the accompanying drawings, in which.

DETAILED DESCRIPTION

Figure 1:
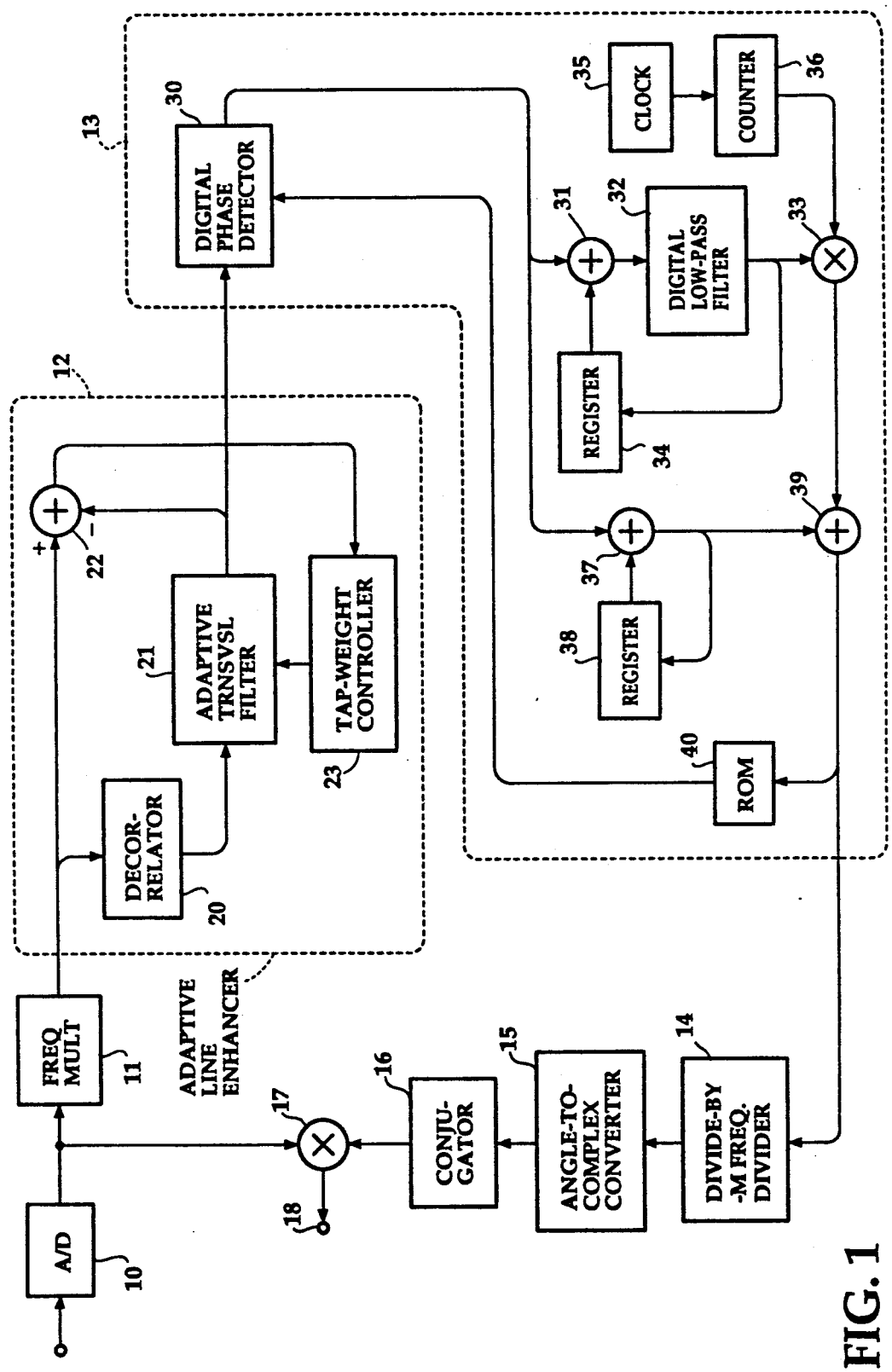
FIG. 1 is a block diagram of a PSK coherent demodulator according to a first embodiment of the present invention.
Figure 3:
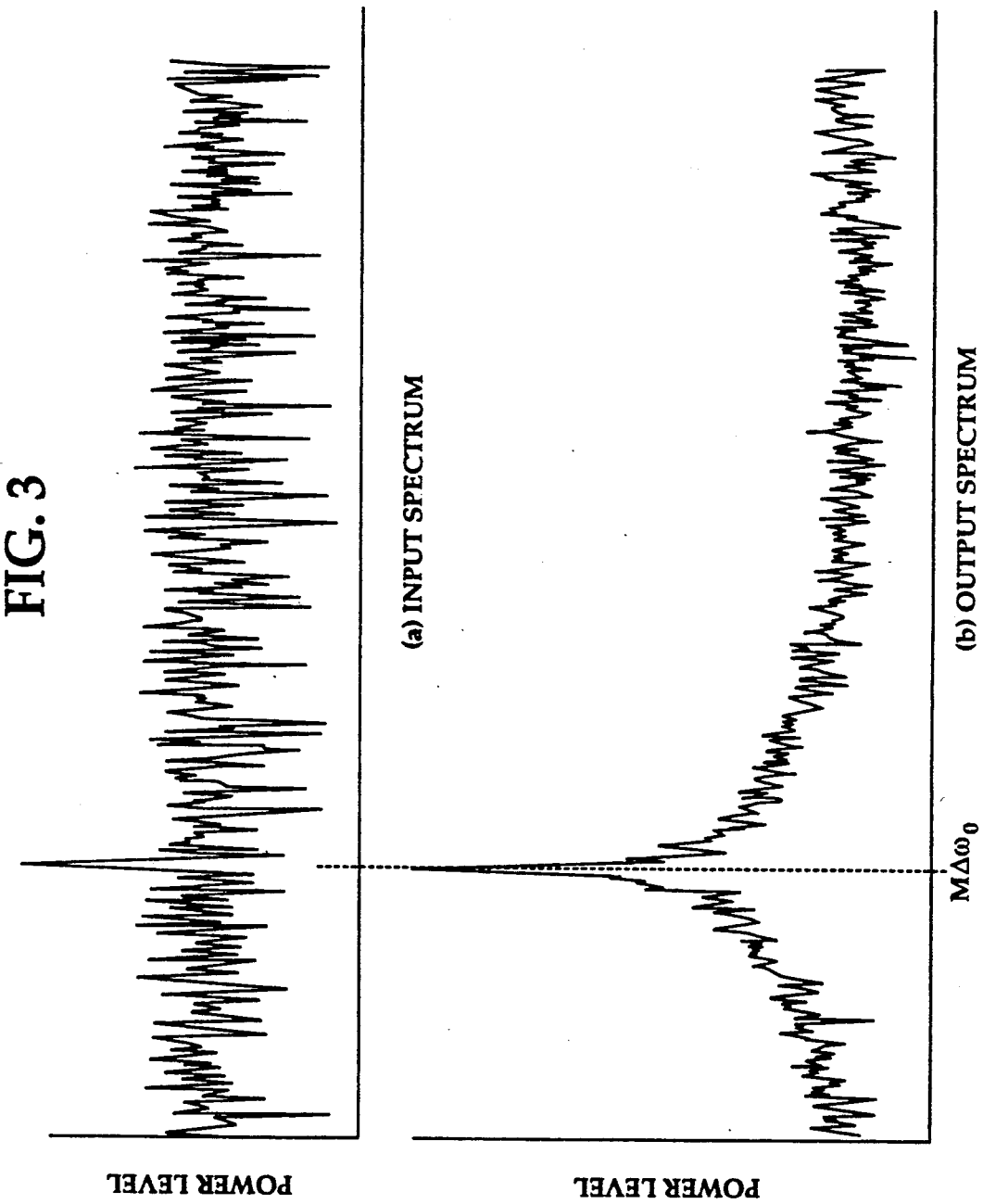
FIG. 3 is a spectrum diagram showing input and output spectrums of the adaptive line enhancer of FIGS. 1 and 2.

Referring now to FIG. 1, there is shown a PSK (phase-shift keying) coherent demodulator according to a first embodiment of the present invention. A received M-ary PSK signal is converted to a baseband complex signal r(t) by a demodulation process using a fixed-frequency local oscillator, not shown, and is converted to a digital signal r(i) (where i = 1, 2, 3, ... ) by an analog-to-digital converter 10 at eye-opening intervals equal to baud interval $T_b$. The signal at the output of sampler 10 is a sum of additive white Gaussian noise and the modulated carrier whose center frequency is offset from the nominal value by $\Delta\omega_0$. The output of A/D converter 10 is supplied to a digital frequency multiplier 11 which multiplies the frequency of the digital signal r(i) by a factor M. This frequency multiplication removes the modulating signal component from the time-discrete signal r(i). The frequency-multiplied signal has a line spectrum which is located at $M \cdot \Delta\omega_0$ as shown in part (a) of FIG. 3, and is applied to a delay operator, or decorrelator 20 and to one input of a digital subtractor 22 of an adaptive line enhancer 12. The output of decorrelator 20 is supplied to the tapped-delay line of an adaptive transversal filter 21 whose tap-weight multipliers are connected to successive taps of the tapped-delay line. The tap-weight multipliers of the transversal filter 21 are summed by an adder and fed to the second input of subtractor 22. The difference between the two inputs of the subtractor 22 is derived as an error signal and supplied to a tap-weight controller 23 to control the tap weights of the transversal filter 21.

As described in "Adaptive Noise Cancelling: Principles and Applications", Proceedings of IEEE, Vol. 63, No. 12, December 1975, B. Widrow et al, transversal filter 21 has a transfer function $H(\omega)$ which is given by:

$$H(\omega) = S_{rx}/S_{xx} \quad (1)$$

where, Srx represents the cross-correlation spectrum between the output r(i) of frequency multiplier 11 and the output x(i) of decorrelator 20, and Sxx represents the auto-correlation spectrum of the signal x(i). Let r(i) and x(i) be respectively denoted as follows:

$$\left. \begin{array}{l} r(i) = a(i) + n(i) \\ x(i) = a'(i) + n'(i) \end{array} \right\} \quad (2)$$

where, a and n represent the carrier and noise components, respectively. Substituting Equations 2 into Equation 1 gives the following Equation:

$$H(\omega) = S_{aa}/(S_{aa} + S_{nn})nT_b \quad (3)$$

where, n is an integer and $nT_b$ represents the amount of delay introduced by decorrelator 20.

Equation 3 indicates that, by passing the delayed signal x(i) through transversal filter 21, the noise component is removed and the carrier component a(i) appears at the output of the filter. Adaptive line enhancer 12 is therefore a high Q narrow band-pass filter which adaptively enhances the line spectrum of the carrier component as shown in part (b) of FIG. 3. The carrier-to-noise ratio is therefore significantly improved. The narrow band-pass filter has a linear operating characteristic which is invariant within the Nyquist frequency range regardless of which part of the range contains the line spectrum.

The carrier offset $\Delta\omega_0$ has occurred due to inherent discrepancies between the local oscillator frequencies at the transmit and receive ends of the system particularly due to temperature differences. Such carrier offset tends to generate a tracking error in the adaptive line enhancer 12, which results in a constant value of phase error if the carrier drift is constant. This constant phase error is represented by deviations from signal points in the phasor diagram and appears in at the output of product demodulator 17.

To derive an ideal carrier by removing the phase error, the output of adaptive line enhancer 12 is supplied to a digital phase detector 30 of a synchronizer 13 for making a phase comparison with a digital sinusoidal wave supplied from a read-only memory 40. Synchronizer 13 includes an adder 31 which provides a sum of the output of phase detector 30 and the output of a register 34 whose input is coupled through a digital low-pass filter 32 to the out of adder 31. The output of low-pass filter 32 is also connected to one input of a digital multiplier 33 which multiplies a time-indicating count from a counter 36 that counts pulses from a clock source 35. The output of phase detector 30 is also coupled to an adder 37 which combines it with the output of a register 38 and supplies the sum to an adder 39 which combines it with the output of multiplier 33. The output of adder 39 is supplied as an address input to the read-only memory 40 to read out the digital amplitude value of a sinusoidal wave for application to the phase detector 30, forming a closed loop.

Adder 31, low-pass filter 32 and register 34 represent a frequency estimating circuit. During the initial period of a training sequence, register 34 is empty, but with time it accumulates the phase detector 30 output as a frequency-related value. The low-pass filter 32 removes frequency components higher than the Nyquist frequency. On the other hand, adder 37 and register 38 represent a phase estimating circuit. Similar to register 34, register 37 is initially empty, but accumulates the phase detector output as a phase-related value. As closed loop operation proceeds, the contents of both registers 31 and 37 respectively approach to optimum values that drive the output of phase detector 30 to a minimum.

Counter 36, multiplier 33, adder 39 and ROM 40 constitute a digital sinusoidal wave generator. The multiplication by the output of counter 36 represents a digital frequency-estimate signal and is combined by adder 39 with a digital phase-estimate signal supplied from adder 37.

The output of adder 39 is reduced in frequency to the original carrier frequency by a divide-by-M frequency divider 14 and converted to a complex signal z(i) by an angle-to-complex converter 15 as follows:

$$z(i) = \exp\{j\Phi_i\} \quad (4)$$

where j is the complex operator. The angle to complex-converter 15 can be implemented as a read-only memory.

The output of angle-to-complex converter 15 is supplied to a conjugator 16 which produces a conjugate of the complex signal from converter 15 and a pair of such conjugates is applied as an estimate of the carrier to a digital multiplier, or product demodulator 17 to which the digital PSK input r(i) is also applied to recover the modulating digital signal at output terminal 18.

Since the output of product demodulator 17 contains no carrier offset component, the capture range $f_{cap}$ of the coherent demodulator is given by:

$$f_{cap} = \pm f_b/2M \quad (5)$$

where $f_b$ represents the signal transmission rate. The carrier frequency offset therefore does not affect the capture range.

Figure 2:
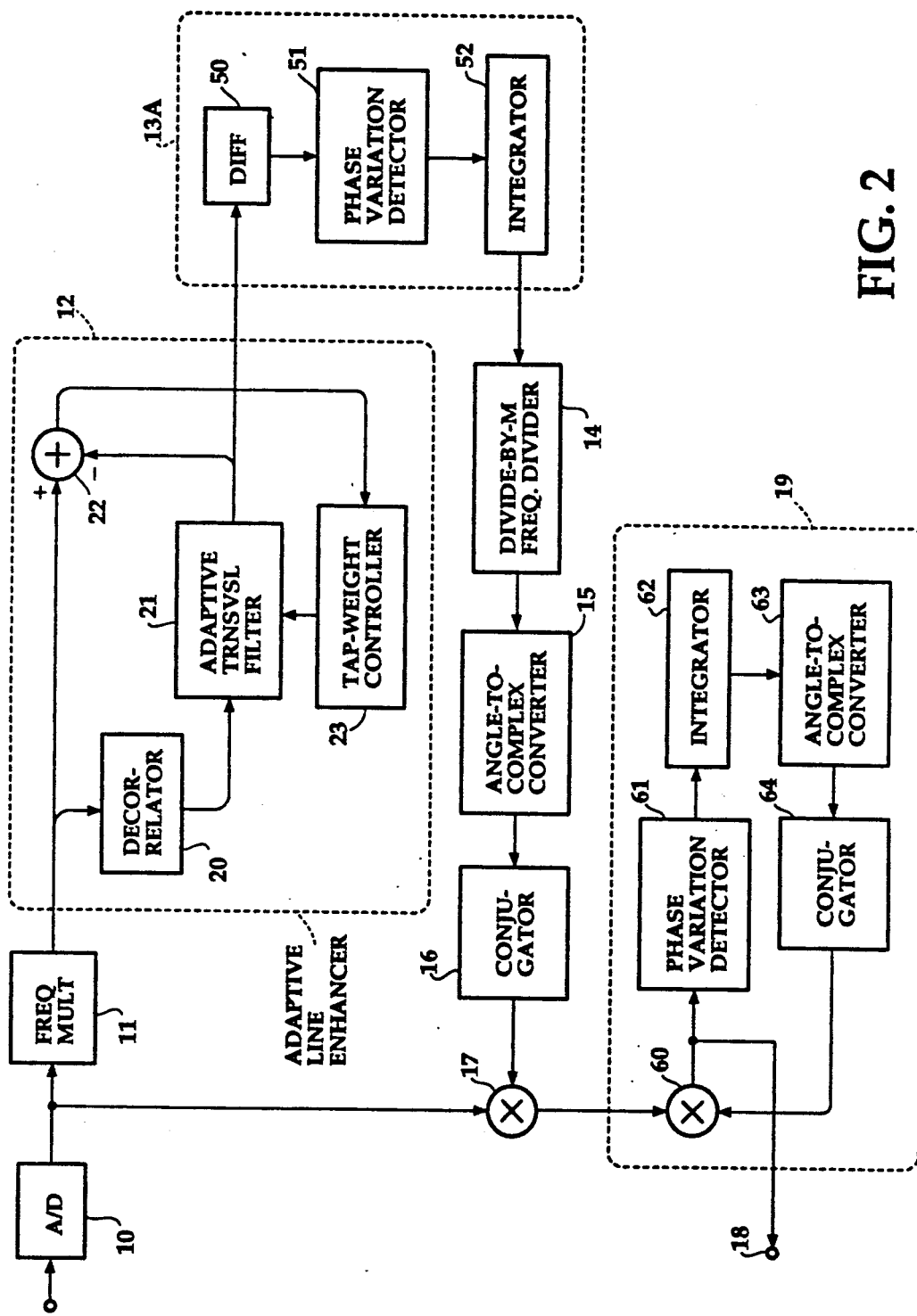
FIG. 2 is a block diagram of a PSK coherent demodulator according to a second embodiment of the present invention.

According to a second embodiment of the present invention, as shown in FIG. 2, the elimination of the above-mentioned phase error and derivation of the ideal carrier is provided by a phase error canceller 19, using a complex-to-angle converter 13A which converts the output of adaptive line enhancer 12 to an angular signal, or phase variation signal. Converter 13A comprises a digital differentiator 50, a phase variation detector 51 and an integrator 52, all of which are connected in series. The output of integrator 52 is supplied to divide-by-M frequency divider 14, converted to a complex signal by converter 15, a pair of conjugates of the complex signal is produced by conjugator 16 and applied to the product demodulator 17, as in the first embodiment.

The output of product demodulator 17 is applied to a phase deviation canceller 19 to remove the phase error. Phase deviation canceller 18 is a first-order phase-locked loop which comprises a multiplier 40 to which the output of multiplier 17 is applied, a phase variation detector 41 connected to the output of multiplier 40, an integrator 42 connected thereto, a angle-to-complex converter 43 for converting the integrated signal into a complex signal and a conjugator 44 connected to the converter 43 output. The output of conjugator 44 is supplied as a feedback signal to multiplier 40 where it is multiplied by the output of product demodulator 17 to produce an error-free signal which leads to an output terminal 18.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A coherent demodulator for demodulating an incoming M-ary PSK (phase-shift keying) signal, said coherent demodulator comprising:

frequency multiplier means for multiplying the frequency of said M-ary PSK signal by a factor M to produce a carrier having a line spectrum;

delay means coupled to said frequency multiplier means for delaying said carrier for a predetermined duration;

an adaptive transversal filter having a tapped-delay line coupled to said delay means to produce successively delayed carrier components, and a plurality of tap-weight multipliers connected respectively to successive taps of said tapped-delay line for weighting said carrier components with tap-weight coefficients to produce weighted carrier components, and for summing said weighted carrier components to produce an adaptively filtered signal;

detector means coupled to said frequency multiplier means and to said adaptive transversal filter for detecting a difference between said carrier and said filtered signal;

tap-weight control means coupled to said detector means for generating said tap-weight coefficients in accordance with said difference;

frequency divider means for dividing the frequency of said filtered signal from said adaptive transversal filter by M; and product demodulator means for demodulating said incoming M-ary PSK signal with an output signal of said frequency divider means.

2. A coherent demodulator as claimed in claim 1, further comprising:

digital phase detector means coupled to said adaptive transversal filter for detecting a phase difference between said carrier and a digital sinusoidal wave supplied thereto;

a closed-loop frequency estimating circuit including a first register, a first adder and a digital low-pass filter, said first adder having a first input connected to an output of said digital phase detector means and a second input connected to an output of said first register, said first adder providing a sum of a digital phase difference from said digital phase detector means and a content of said first register and supplying said sum to said digital low-pass filter, said digital low-pass filter eliminating frequency components higher than the Nyquist frequency from an output of said first adder and supplying a low-pass filtered signal to said first register;

means for generating a digital value which increments as a function of time;

means for multiplying said incremental digital value by said low-pass filtered signal to produce a frequency estimate signal;

a closed-loop phase estimating circuit including a second register and a second adder having a first input connected to said output of said digital phase detector means and a second input connected to an output of said second register, said second adder providing a sum of said digital phase difference and a content of said second register and supplying said sum to said second register as a phase estimate signal;

means for summing said frequency estimate signal and said phase estimate signal to produce a sum signal and for applying said sum signal to said frequency divider means; and means for generating said digital sinusoidal wave in accordance with said sum signal.

3. A coherent demodulator as claimed in claim 1, further comprising:

differentiator means for differentiating a summed output signal from said adaptive transversal filter;

phase variation detector means for detecting a phase variation of an output of said differentiator means;

integrator means for integrating an output of said phase variation detector means and for applying an integrated output to said frequency divider means; and means for converting said output of said frequency divider means to a pair of complex signals and for applying said complex signals to said product demodulator means as said output signal of said frequency divider means.

4. A coherent demodulator as claimed in claim 3, further comprising:

multiplier means for multiplying an output of said product demodulator means with a feedback signal supplied thereto;

means for detecting a phase variation appearing at an output of said multiplier means; and means for converting a detected phase deviation into a pair of complex signals and for supplying said complex signals to said multiplier means as said feedback signal.

* * * * *